April 2, 1935.   A. J. FISHER   1,996,573
CLOSED CAR VENTILATION
Filed Dec. 21, 1932   2 Sheets-Sheet 1
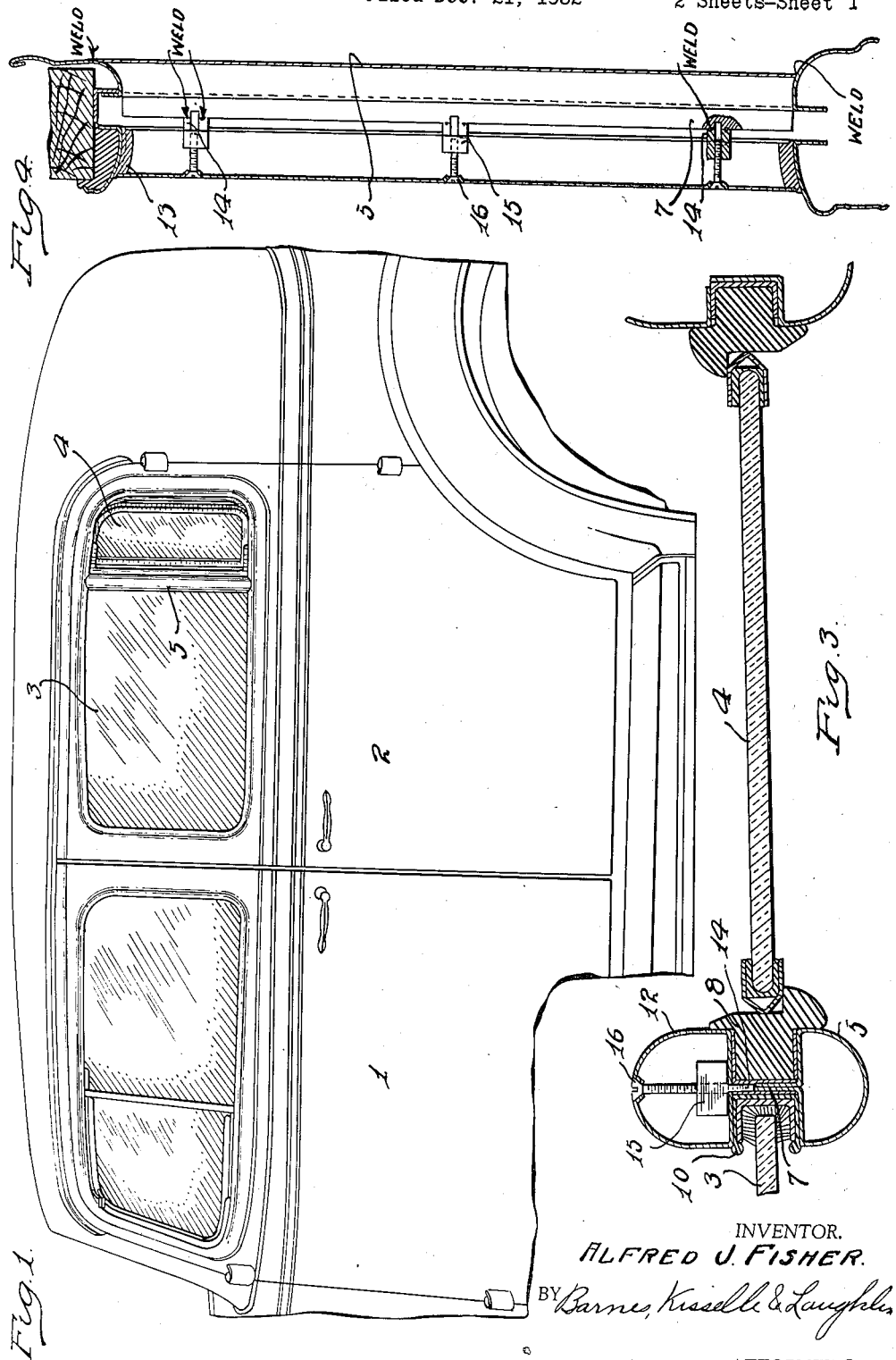
INVENTOR.
ALFRED J. FISHER.
BY Barnes, Kisselle & Laughlin
ATTORNEYS.

April 2, 1935.                A. J. FISHER                 1,996,573
                           CLOSED CAR VENTILATION
                            Filed Dec. 21, 1932           2 Sheets-Sheet 2
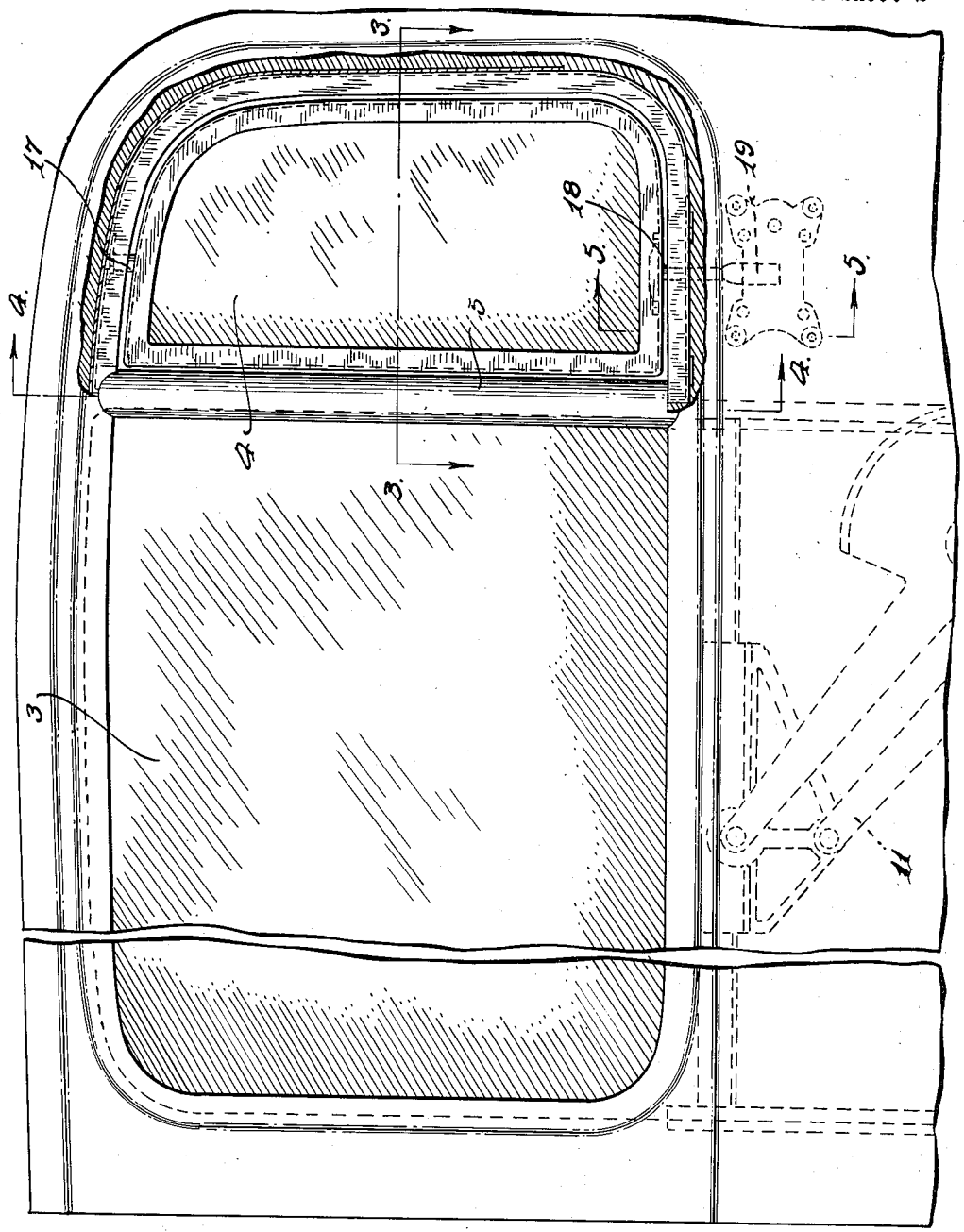
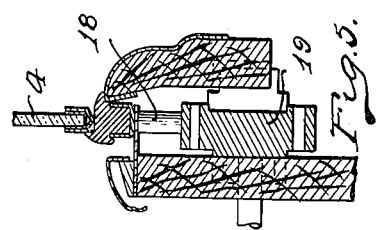
INVENTOR.
ALFRED J. FISHER.
BY Barnes, Kisselle & Laughlin
ATTORNEYS.

Patented Apr. 2, 1935

1,996,573

UNITED STATES PATENT OFFICE 1,996,573

CLOSED CAR VENTILATION

Alfred J. Fisher, Detroit, Mich., assignor to Ternstedt Manufacturing Company, Detroit, Mich., a corporation of Michigan Application December 21, 1932, Serial No. 648,187

7 Claims. (Cl. 296—44)

This invention relates to vehicle bodies and especially automobile bodies, but is capable of a wider range of use. In the prior application, Serial No. 644,622, there is described and claimed a ventilating system in which the swinging ventilating panels create loops of air which can be largely controlled by the operation of the sliding panels. In this system, the sliding panels also cooperate in connection with the swinging panels of some of the other windows so a general system of ventilation is provided in which each individual has a large measure of control of the air currents that affect him.

In my principal system, the swinging ventilators are placed at the front of the window opening and it has been found that only a single ventilator can be advantageously used in connection with a car that has only two window openings on a side, this ventilator being at the front of the front window opening. It is the object of the present invention to provide a ventilating system of this same general description but in which the rear ventilating panel can be placed at the rear of the window opening in which it is located. This is especially desirable on some of the bodies that have only two windows on a side such as some forms of coaches and four door sedans without rear quarter windows.

Referring to the drawings:

Fig. 1 is a side elevation of one of these bodies.

Fig. 2 is a fragmentary side elevation showing some of the parts in dotted lines to give the details of the mechanism.

Fig. 3 is a section taken on the line 3—3 of Fig. 2.

Fig. 4 is a vertical elevation taken on the line 4—4 of Fig. 2.

Fig. 5 is a section taken on the line 5—5 of Fig. 2.

The body shown in the drawings consists of a body having a front door 1 and a rear door 2. It has been found that if the rear ventilating panel is placed at the front of the second window opening that the air flow will be so strong on the back of the neck of the occupant of the front seat that the arrangement is not very desirable. Furthermore, the seats are so arranged that the occupant of the rear seat will get little benefit from the air loop that will be formed by the air entering at the front of the ventilating panel and being drawn out at the rear.

If the ventilating panel then is simply shifted to the rear of the window opening, satisfactory results will not be obtained. I have discovered that by employing an additional window post in front of the ventilator, that the panel may be placed at the rear of the window opening and satisfactory results obtained. Apparently when the ventilator is placed at the rear of the window opening with simply some form of joint between the ventilator and the sliding panel, the air will flow into the body with a fairly high velocity through the opening forward of the pivots of the pivoted ventilator into the body and forwardly, and then out of the front window opening. This air makes a draft on the neck of the occupant of the front seat. Some of this air flowing in forward of the pivots will loop backwardly at a very low velocity and flow out of the opening to the rear of the pivoted panel. Consequently, the desirable effect that takes place in my previous application is not present or at least it is present in only a more or less limited degree. What I refer to is the air loop that is generated by the aspirating action that takes place at the rear edge of the pivoted panel and the large amount of air that is drawn in at the forward edge of the pivoted panel. I have found that by the use of a suitable intervening post in the window opening, this aspirating action and the loop flow of the air can be secured with a ventilating panel at the rear of the window opening, the same as at the forward portion of the window opening, as explained in my prior application. Apparently the window post breaks up the stream of air through which the car moves, and creates a turbulence to the rear of the window post in the opening forward of the pivots of the pivoted panel and at the same time the window post serves as a deflector for the air flowing into the body forwardly of the pivots of the pivoted panel and causes most of this in-rushing, fairly high velocity air flow to loop rearwardly and outwardly through the opening to the rear of the pivots of the pivoted panel. When the window post is used between the rear edge of the sliding panel and the forward edge of the pivoted panel, only a small amount of low velocity air flows through the opening in front of the pivots of the pivoted panel and forwardly of the body and thence out of the front window opening. Hence, the exhausting effect of the air through which the car moves is confined to the rear edge of the panel and here it is at its maximum. Consequently, there is a strong flow of air out of the body at this point. This draws in air at the forward opening of the ventilating panel and forms the desirable loop that I have described more in detail in my prior application. The post has the added feature that being relatively deep as shown in Fig. 3, it tends to act as a deflector to disperse the air coming in at the forward side of the ventilator and keep it off the back of the necks of the occupants of the front seat.

The amount of air and its direction may be controlled to a certain extent by raising or lowering the sliding panel 3. As explained in my prior application, this acts as a valve to cause the dispersion of the air in the loop. Of course, in the arrangement that I am now describing, it tends to separate part of the air in the loop and allow it to flow forward and out of the portion of the window controlled by the sliding panel. Undoubtedly some air also flows in through the open sliding window 3. Then too, when the sliding panel 3 is lowered and the swinging panel 4 to the rear swung to scoop position, it would appear that a greater amount of air will be passed into the body through the window opening than in the case where the pivoted panel is positioned forward of the sliding panel and swung to scooping position with the sliding panel lowered. It is difficult to describe with absolute accuracy all the conditions that obtain by the cooperating of the sliding panel 3 and the swinging panel 4 as these all depend on the cross winds, the speed of the vehicle and other factors but nevertheless the sliding panel 3 forward of the swinging panel 4 undoubtedly has a regulatory function in connection with the swinging panel 3.

It will be remembered that in my prior application a stationary panel in the rear quarter window was the preferred construction for the reason that this panel could be lowered so little by reason of the interference of the wheel housing that it was not worth while to provide one. In the present arrangement with the swinging panel placed at the rear of the window opening, this affords the additional feature of permitting a substantially full drop sliding panel because the swinging panel occupies the space in the window opening where the interference would otherwise take place.

Now to pass to the details: The embodiment of my idea that happens to be chosen but which is not in any way essential as other modifications are available, comprises a tubular post 5 of opposed semi-circular sections in cross section. This is welded at the top and bottom to the body panel as is indicated on the drawings. The semi-circular tubular sections are provided with inturned and abutting flanges 7. These abutting flanges form the bottom of the window guide recess and the bottom of the recess that supports the rubber window stop 8 for the swinging ventilator 4. The window channel 10 forms a guide for the sliding window 3 which is raised and lowered by a window regulator shown in dotted lines and designated 11. The inside wall of these recesses is afforded by the turned in portions of the semicircular (in cross-section) post section 12, shown in Fig. 3. This post section may be of grained metal or wood to harmonize with the interior garnish molding. At the top and bottom it is seated on a rubber block 13. Nuts 15 have projecting forked ribs 14 whose ends are welded at 20 to the ends of the inturned flanges, which are notched to register with the space between the forks, into which can be turned the screws 16 by which the inner post section is held to the outer post section. This forms a convenient assembly by which the window guide and the rubber window stop 8 may be assembled in place or disassembled.

The pivots for the swinging ventilator panel are located at 17 and 18. This lower pivot extends down into the window regulator 19 which is not shown in detail but which is of the same character as shown in my prior application, consisting of a worm and worm gear which may be mechanically turned and operates as a lock to hold the window adjusted in any desired position.

What I claim is:

1. In a vehicle body, a window frame, a post in the window frame dividing the window frame to form a forward and a rear opening and a swinging panel pivoted to the rear of its forward edge located in the rear opening, said post comprising an outer semi-circular section secured at its end to the adjoining panel of the body and an inner post section securable by screws to the outer post section.

2. In a vehicle body, a window frame, a post in the window frame dividing the window frame to form a forward and a rear opening and a swinging panel pivoted to the rear of its forward edge located in the rear opening, an outer post section secured at its ends to the body panel, an inner post section secured by screws to the outer post section and blocks of cushioning material located at one or both ends of said post.

3. In a vehicle body, a window frame, a post in the window frame dividing the window frame to form a forward and a rear opening and a swinging panel pivoted to the rear of its forward edge located in the rear opening, said post comprising an outer post section secured at the top and bottom to the body panel and comprising a semicircular member with abutting flanges which form the bottom of the window groove and the window stop recess and an inner semi-circular post secured by screws to the outer post section.

4. In a vehicle body, a window frame, a post in the window frame dividing the window frame to form a forward and a rear opening and a swinging panel pivoted to the rear of its forward edge located in the rear opening, an outer post section welded at its top and bottom to the body panel, said post semi-circular in cross section and having inturned abutting edges, an inner post section semi-circular in cross section, clips containing nuts and welded to the abutting edges of the outer section and screws for securing the inner post section to said nuts which are anchored to the outer post section.

5. The combination with a vehicle closed body having a side wall and side doors the rear one of which is cut away at the rear lower corner, of a plurality of window openings in the same and the window opening in the rear door having a window well below the front portion of the window opening forward of said cut-away portion, a division pillar located in said window opening and running from top to bottom of said opening and coinciding with the rear of the window well, said division pillar having a window guide on its forward side and having considerable width in a direction cross-wise of the vehicle body to approximate the wall thickness of the vehicle body, a vertically adjustable and slidable window adapted to be raised and completely lowered in the window well and the front portion of the window opening, and a swinging supplementary panel located in the remaining window opening space to the rear of said pillar and above the cut-away portion of the door and pivoted on an up and down axis located intermediate its front and rear edges to permit the front edge of the panel to be swung in and the rear edge of the panel to be swung out.

6. The combination claimed in claim 5 wherein the division pillar is an insert pillar inserted in a conventional body window opening and acts as a deflector tending to prevent the flow forward of air which is drawn in through the opening between the front edge of the swinging panel and the division pillar.

7. The combination claimed in claim 5 in which the division pillar projects a substantial distance on both sides of the sliding glass panel when raised and serves on the inside of the body to tend to prevent air drawn in forward of the swinging panel, when open, moving forward in the vehicle body and the portion of the division pillar projecting to the outside of the sliding glass panel operating as a baffle to facilitate air being drawn in forward of the swinging panel, when the panel's forward edge is swung in, by reason of the aspirating effect generated at the rear edge of the swinging panel when swung outwardly when the vehicle is in motion.

ALFRED J. FISHER.